(12) United States Patent
Tang et al.

(10) Patent No.: US 12,363,065 B2
(45) Date of Patent: Jul. 15, 2025

(54) DATA PACKET TRANSMISSION METHOD AND APPARATUS, DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventors: Xiaoman Tang, Shenzhen (CN); Cheng Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/527,813

(22) Filed: Dec. 4, 2023

(65) Prior Publication Data

US 2024/0106792 A1 Mar. 28, 2024

Related U.S. Application Data

(63) Continuation of application No. PCT/CN2023/076344, filed on Feb. 16, 2023.

(30) Foreign Application Priority Data

Mar. 31, 2022 (CN) .......................... 202210344824.5

(51) Int. Cl.
*H04L 61/2592* (2022.01)
*H04L 12/46* (2006.01)

(52) U.S. Cl.
CPC ...... *H04L 61/2592* (2013.01); *H04L 12/4633* (2013.01)

(58) Field of Classification Search
None
See application file for complete search history.

(56) References Cited

U.S. PATENT DOCUMENTS 10,904,342 B2 * 1/2021 Tollet ................. H04L 12/4633
11,178,107 B2 * 11/2021 Schloss .............. H04L 63/0236
(Continued)

FOREIGN PATENT DOCUMENTS

CN 101610296 A 12/2009
CN 103369065 A 10/2013
(Continued)

OTHER PUBLICATIONS

The World Intellectual Property Organization (WIPO) International Search Report for PCT/CN2023/076344 May 16, 2023 6 pages (including English translation).
(Continued)

*Primary Examiner* — Phyllis A Book
(74) *Attorney, Agent, or Firm* — ANOVA LAW GROUP, PLLC

(57) ABSTRACT

A data packet transmission method performed by a gateway node includes determining a first Internet protocol (IP) address from an IP address pool according to a request data packet transmitted by a client. The IP address pool includes one or more reserved IP addresses not recognizable by a business server. The method further includes generating a first data packet according to the request data packet and the first IP address as a source IP address of the first data packet, performing tunnel encapsulation on the first data packet to obtain a second data packet that includes content of the first data packet, and transmitting the second data packet to the business server.

19 Claims, 5 Drawing Sheets

(56) References Cited

U.S. PATENT DOCUMENTS

| | | | |
|---|---|---|---|
| 2004/0037284 A1* | 2/2004 | Bergek | H04L 69/08 370/466 |
| 2011/0280244 A1* | 11/2011 | Gopinath | H04L 67/1001 370/392 |
| 2013/0022033 A1 | 1/2013 | Shi | |
| 2013/0336320 A1* | 12/2013 | Rangaraman | H04L 45/38 370/392 |
| 2013/0339549 A1* | 12/2013 | Rangaraman | H04L 61/103 709/245 |
| 2013/0339550 A1* | 12/2013 | Rangaraman | H04L 69/166 709/245 |
| 2014/0301388 A1* | 10/2014 | Jagadish | H04L 67/563 370/389 |
| 2015/0043350 A1* | 2/2015 | Basilier | H04L 63/0272 370/235 |
| 2015/0124828 A1* | 5/2015 | Cj | H04L 12/4633 370/392 |
| 2016/0087940 A1 | 3/2016 | Miller et al. | |
| 2017/0078197 A1* | 3/2017 | Cj | H04L 45/745 |
| 2017/0244637 A1* | 8/2017 | Singhal | H04L 45/7453 |
| 2019/0199636 A1* | 6/2019 | Narayanan | H04L 47/125 |
| 2020/0344084 A1* | 10/2020 | Shribman | H04L 67/1021 |

FOREIGN PATENT DOCUMENTS

| | | |
|---|---|---|
| CN | 104954155 A | 9/2015 |
| CN | 105515979 A | 4/2016 |
| CN | 107995324 A | 5/2018 |
| CN | 109525684 A | 3/2019 |
| CN | 111629084 A | 9/2020 |
| CN | 111866212 A | 10/2020 |
| CN | 112491721 A | 3/2021 |

OTHER PUBLICATIONS

China National Intellectual Property Administration (CNIPA) Office Action 1 for 202210344824.5 Mar. 7, 2015 10 Pages (including translation).

* cited by examiner

DATA PACKET TRANSMISSION METHOD AND APPARATUS, DEVICE, STORAGE MEDIUM, AND PROGRAM PRODUCT

CROSS-REFERENCE TO RELATED APPLICATIONS

This application is a continuation of International Application No. PCT/CN2023/076344, filed on Feb. 16, 2023, which claims priority to Chinese Patent Application No. 202210344824.5, entitled "DATA PACKET TRANSMISSION METHOD AND APPARATUS, DEVICE, STORAGE MEDIUM, AND PROGRAM PRODUCT," filed on Mar. 31, 2022, which are incorporated herein by reference in their entirety.

FIELD OF THE TECHNOLOGY

This application relates to the technical field of Internet and computers and, in particular, to a data packet transmission method and apparatus, a device, a storage medium, and a program product.

BACKGROUND OF THE DISCLOSURE

The upper limit of the number of connections that can be established between a gateway node and a business server is determined by an Internet protocol (IP) address in the five-tuple information. The number of connections that can be established between a gateway node and a business server is limited to more than 60,000 (the maximum number is 65536, minus some used as system ports and internal reservation ports). The five-tuple information includes a source IP address, a source port, a destination IP address, a destination port, and a transport layer protocol. For example, 192.168.1.1 10000 TCP 121.14.88.76 80 constitutes a piece of five-tuple information, where 192.168.1.1 is a source IP address, 10000 is a source port, TCP is a transport layer protocol, 121.14.88.76 is a destination IP address, and 80 is a destination port.

In the related art, a gateway node is configured with a plurality of routable IP addresses through a switch to increase the concurrent connection number of the gateway node. After obtaining the routable IP address assigned by the switch, the gateway node performs a restart procedure. The restarted gateway node may communicate with the Internet using the routable IP address assigned by the switch.

However, in the related art, the number of routable IP addresses that can be allocated by one switch is limited, and in the case where one switch manages a plurality of gateway nodes, a sufficient number of routable IP addresses cannot be simultaneously provided for the plurality of gateway nodes, and thus the concurrent connection capability of the gateway nodes cannot be effectively improved.

SUMMARY

In accordance with the disclosure, there is provided a data packet transmission method performed by a gateway node and including determining a first Internet protocol (IP) address from an IP address pool according to a request data packet transmitted by a client. The IP address pool includes one or more reserved IP addresses not recognizable by a business server. The method further includes generating a first data packet according to the request data packet and the first IP address as a source IP address of the first data packet, performing tunnel encapsulation on the first data packet to obtain a second data packet that includes content of the first data packet, and transmitting the second data packet to the business server.

Also in accordance with the disclosure, there is provided a computer device including one or more processors and one or more memories storing one or more computer programs that, when executed by the one or more processors, cause the one or more processors to determine a first Internet protocol (IP) address from an IP address pool according to a request data packet transmitted by a client. The IP address pool includes one or more reserved IP addresses not recognizable by a business server. The one or more computer programs further cause the one or more processors to generate a first data packet according to the request data packet and the first IP address as a source IP address of the first data packet, perform tunnel encapsulation on the first data packet to obtain a second data packet that includes content of the first data packet, and transmit the second data packet to the business server.

Also in accordance with the disclosure, there is provided a data packet transmission method performed by a business server and including receiving a second data packet transmitted by a gateway node. A source Internet protocol (IP) address of the second data packet is an IP address of the gateway node. The method further includes performing tunnel de-encapsulation on the second data packet to obtain a first data packet, and obtaining request information of the request data packet from the first data packet.

DESCRIPTION OF EMBODIMENTS

Load balancing is a distributed deployment method for splitting a business. Taking a server as an example, with the continuous increase of user access, a single server faces the problems of large access, high concurrent volume, and mass data. In the case where the individual capacity reaches a limit, a transition from an individual website to a distributed website is required. In the case where a plurality of servers provide business services, external services are provided through a unified traffic portal. A load balancing method is used to distribute the request traffic of a client to various servers in a balanced manner.

Implementations of load balancing include, but are not limited to, realizing load balancing, hardware load balancing, and software load balancing through a domain name system (DNS).

The load balancing method (also called the scheduling algorithm) mainly includes the following types.

A round-robin (RR) scheduling algorithm refers to circularly allocating a received request to each server in a server cluster. In the case of similar performance in each server in the server centralization, using this method can make the load of each server in the server cluster close.

A weighted round-robin (WRR) scheduling algorithm refers to setting a weight for each server in the server centralization based on the RR scheduling algorithm and allocating a request for each server in a server cluster according to the weight.

A least-connection (LC) scheduling algorithm refers to allocating requests for servers based on the connection number maintained by servers in a server cluster (servers with a small connection number are preferentially allocated).

A concurrent connection number refers to the maximum connection number the business server can maintain. The connection can be understood that a client and a business server perform data packet transmission according to a communication protocol. In some examples, the concurrent connection number may be further understood to be the connection number that can be carried by at least one port of the business server.

A content delivery network (CDN) refers to a network system interconnected through the Internet. The CDN sends music, pictures, videos, applications, and other files to the client using the business server closest to the client. In this way, network content can be delivered to users with high performance, scalability, and low cost. The CDN includes a plurality of network nodes, and content transmission is performed dynamically between each network node to improve the speed of obtaining desired content by a client.

Figure 1:
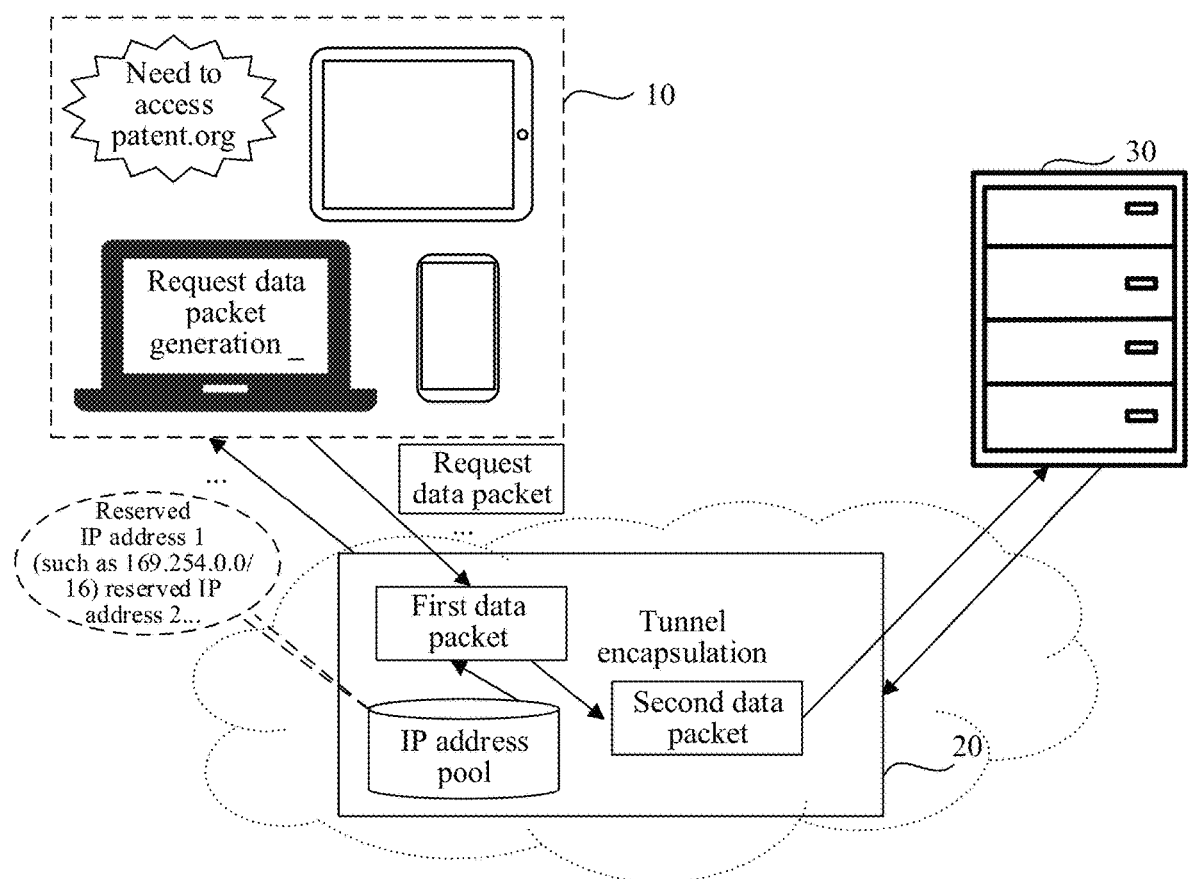
FIG. 1 is a diagram of a data packet transmission system provided by an exemplary embodiment of this application.

FIG. 1 is a diagram of a data packet transmission system provided by an exemplary embodiment of this application. The data packet transmission system may be implemented as a computer system, and the computer system may include a client 10, a gateway node 20, and a business server 30.

The client 10 may be an electronic device such as a personal computer (PC), a tablet computer, a mobile phone, a wearable device, a smart home appliance, and a vehicle terminal. An application runs on the client 10, and the client 10 has at least a data packet transceiving and processing function. Through the data packet transceiving function, the client 10 can establish a communication connection with the gateway node 20 or the business server 30. Through the packet processing function, the client 10 can process the received packets or generate packets for transmission to the gateway node 20 or the business server 30.

A gateway node 20 is used for implementing a communication connection between the client 10 and the business server 30. The gateway node 20 may be one or more computer devices. The gateway node may be a device supporting the connection between the client 10 and the business server 30, such as a load balancing application-type gateway, an application programming interface (API) gateway, a CDN, a node, and a CDN origin station. The API gateway and the CDN node can both support tunnel technology. In some embodiments, the gateway node 20 is used in a cloud platform.

The business server 30 provides background services for the target application running on the client 10. For example, the business server 30 may be the background server for the target application. The business server 30 may be an independent physical server, may be a virtual machine (VM) server, may also be a server cluster or distributed system composed of a plurality of servers, and may also be a cloud server providing basic cloud computing services such as cloud services, cloud computing, cloud functions, cloud storage, network services, cloud communications, domain name services, security services, large data, and artificial intelligence platforms. In one example, in the case where the gateway node 20 belongs to an application-type gateway with load balancing, the business server 30 may refer to a single server or may be a server cluster composed of a plurality of servers.

In one example, the process of the client 10 communicatively connecting with the business server 30 through the gateway node 20 may be understood as the following process: The business server 30 do not establish a communication connection directly with the client 10, but establish a communication connection with the gateway node 20 through the client 10; the gateway node 20 establishes a communication connection with the business server 30.

In the case where the client 10 needs to send request information to the business server 30, the client 10 first sends the request information to the gateway node 20 in the form of a data packet, and the gateway node 20 forwards the data packet with the request information to the business server 30.

Figure 2:
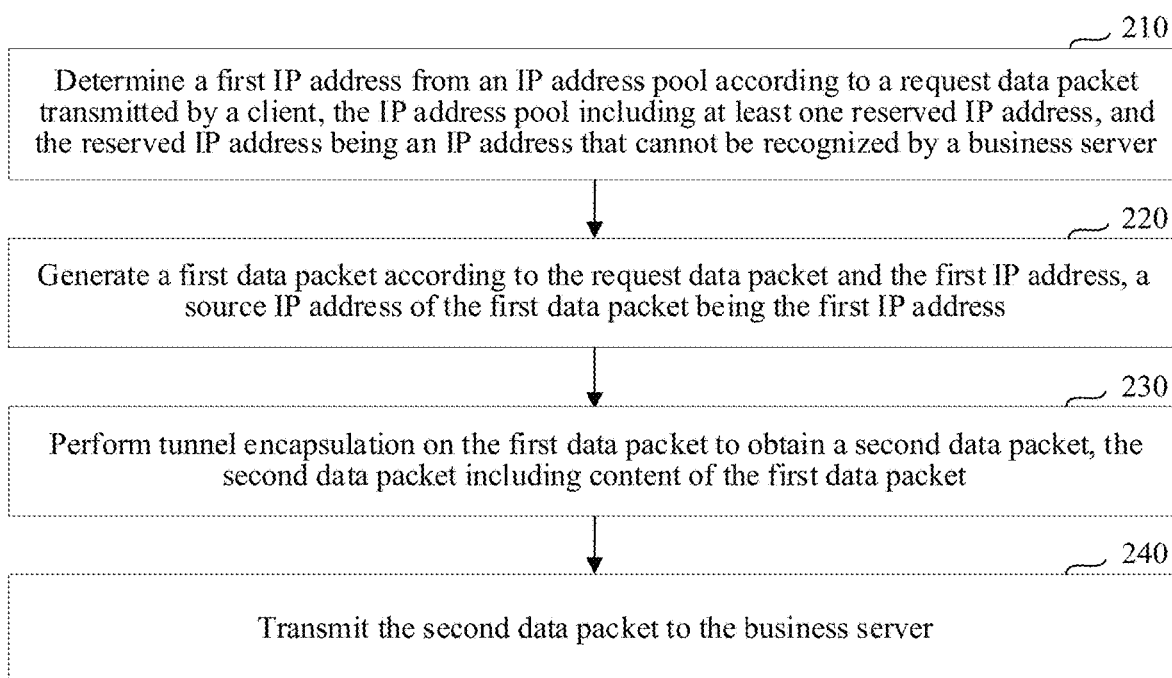
FIG. 2 is a flowchart of a data packet transmission method provided by an exemplary embodiment of this application.

FIG. 2 is a flowchart of a data packet transmission method provided by an exemplary embodiment of this application. Illustratively, the execution subject of the method may be the gateway node 20 shown in FIG. 1. As shown in FIG. 2, the method may include the following processes (210 to 240):

210: Determine a first IP address from an IP address pool according to a request data packet transmitted by a client, the IP address pool including at least one reserved IP address, and the reserved IP address being an IP address that cannot be recognized by a business server. The first IP address is also referred to as a corresponding IP address or a candidate IP address.

The IP address is used for identifying the identities of two parties during Internet communication.

In some embodiments, the reserved IP address refers to an IP address belonging to an unused network segment within the local area network, usually an internal network segment address, for example, a reserved IP address refers to an IP address belonging to a 169.254/16 network segment that includes more than 60,000 reserved IP addresses. Optionally, the reserved IP address is referred to as the reserved address.

The IP address pool includes several reserved IP addresses. The IP address pool may be a network segment composed of several consecutive reserved IP addresses or may include several scattered reserved IP addresses. For example, the IP address pool includes n reserved IP addresses, and n is a positive integer.

Since the concurrent connection number is determined by four factors together, namely, the number of source IP addresses, the number of source IP ports, the number of destination IP addresses, and the number of destination ports, in the case of not changing the number of source IP ports, the number of destination IP addresses, and the number of destination ports, an IP address pool is allocated for the gateway node, increasing the number of IP addresses that can be used by the gateway node, which is equivalent to increasing the number of source IP addresses. In the related art, illustrated with a transmission control protocol (TCP) as a communication protocol, for example, in the case where a gateway node uses a single routable IP address to make a communication connection with a business server, the total number of long connections that the gateway node can establish with the business server is more than 60,000 (the maximum number is 65536, minus some used as system ports and internal reservation ports). In the method, if the IP address pool of a certain gateway node includes 10 reserved IP addresses, the total number of long connections that the gateway node can establish with the business server can reach 600,000. Compared with the related art, the total number of long connections the gateway node establishes with the business server is expanded by 10 times, which helps to expand the concurrent connection number of the gateway node.

A routable IP address can be communicatively connected directly in a public network, so one routable IP address cannot usually be shared by two gateway nodes. The method does not use the reserved IP address to directly perform a communication connection, that is, the reserved IP address belonging to the IP address pool only needs to be perceived by the gateway node. Thus, in a scene where the traffic collision probability is small, the reserved IP addresses assigned to different gateway nodes may be partly the same, improving the utilization of the reserved IP addresses.

In some embodiments, the IP address pool may include IP addresses for other purposes, such as routable IP addresses, in addition to reserved IP addresses.

In some embodiments, the IP address pool of the gateway node is pre-stored in the gateway node. In other embodiments, the IP address pool of the gateway node is dynamically configured by a device other than the gateway node, and reference is made to the following embodiments regarding the specific process by which the gateway node obtains the IP address pool.

A request data packet refers to a packet generated by a client for requesting the establishment of a connection to a business server or for requesting access to a resource in the business server. The request data packet includes the IP address of the client so that the client can be repackaged according to the IP address of the client.

In some embodiments, at least one piece of request information is included in the request data packet. The request information refers to an object or resource to which the client requests access. In some embodiments, the request information includes at least one of the following: a domain name requesting access, a port number of a client, an IP address of the client, and the like.

In some embodiments, a request data packet contains a piece of request information. A request data packet may also contain a plurality of request information, in which case different request information may not request identical objects or resources to be accessed. For example, a certain request data packet includes four pieces of request information, request information 1, request information 2, request information 3, and request information 4; the domain name requesting access of the request information 1, request information 2, and request information 3 is A.org; and the domain name requesting access in the request information 4 is B.org.

In some embodiments, after receiving a request data packet sent by a client, selecting a first IP address (which may be a reserved IP address) corresponding to the request data packet (or request information) in an IP address pool is performed by a forwarding program in a gateway node. In some embodiments, the forwarding program is used for processing the request data packet sent by the client, and may also be used to pre-process the reserved IP address. For details of this process, reference is made to the following embodiments.

The first IP address corresponding to the request data packet is determined by the gateway node in the IP address pool based on the request data packet.

Optionally, the gateway node determines a business server for processing a request data packet based on the request data packet. A gateway node obtains an IP address and a port number of a business server, and the gateway node uses a hash algorithm to process the IP address and the port number of the business server to obtain a hash value. The gateway node determines a first IP address from the IP address pool according to the hash value to obtain a first IP address corresponding to the request data packet.

Optionally, the method for the gateway node to determine the first IP address from the IP address pool according to the hash value includes:

using a hash algorithm to process an IP address and a port number of a business server to obtain a hash value, and determining a first IP address from an IP address pool according to the hash value; and using a hash algorithm to process an IP address of a business server, a port number of the business server, and an IP address of a client to obtain a hash value, and determining a first IP address from an IP address pool according to the hash value.

The hash algorithm, also known as the digest algorithm, functions as calculating any set of input data to obtain an output digest of a fixed length.

For example, when the gateway node performs a hash operation on the IP address and port number of the business server to obtain a hash value of 1, the terminal program takes the reserved IP address with the number 1 in the IP address pool as the first IP address.

For example, if the gateway node performs a hash operation on the IP address and the port number of the business server, and the IP address of the client to obtain a hash value of 2, the terminal program takes the reserved IP address identified as 2 in the IP address pool as the first IP address.

220: Generate a first data packet according to the request data packet and the first IP address, a source IP address of the first data packet being the first IP address.

After determining the first IP address, the gateway node generates a first data packet based on the request data packet and the first IP address. In some embodiments, the generation process of the first data packet is performed by a forwarding program of the gateway node; and in some embodiments, the forwarding program is arranged at an application layer, and the first data packet is referred to as an application layer data packet.

The gateway node writes the first IP address into the request data packet by the forwarding program, thereby generating a first data packet.

The first data packet is used for forwarding the request information in the request data packet to the business server. In some embodiments, the client cannot directly determine the IP address of the business server due to security and the like, and the gateway node forwards the access request of the client to the business server by sending a request data packet to the gateway node.

The source IP address is used by the party sending the data packet during the transmission of the data packet. In some embodiments, the source IP address of the first data packet is located at the packet header of the first data packet. In addition to the source IP address, the packet header of the first data packet may also include a source port number, a destination IP address, a destination port number, and the like. For further details of the generation process of the first data packet, reference is made to the following implementations. The specific format of the packet header of the first data packet is determined according to a communication protocol for transmitting a data packet, and this application is not limited thereto.

230: Perform tunnel encapsulation on the first data packet to obtain a second data packet, the second data packet including content of the first data packet.

After generating the first data packet, the gateway node performs tunnel encapsulation on the first data packet to obtain a second data packet. Since at this time, the source IP address in the first data packet is a reserved IP address and cannot be identified by other devices in the public network, the first data packet cannot be directly sent to the business server. A second data packet is obtained by performing tunnel encapsulation on the first data packet, and the second data packet is transmitted in a public network. The destination IP address and the destination port number of the second data packet are the same as the destination IP address and the destination port number of the first data packet.

Tunnel encapsulation is a part of tunneling, which means that a data packet that cannot be directly transmitted to a data packet receiver is encapsulated according to a tunneling protocol. The gateway node and the business server use the same tunneling protocol to process a data packet (for example, a first data packet) to be transmitted.

Optionally, tunnel encapsulation refers to encapsulating a packet header of a tunneling protocol commonly used by a gateway node and a business server before a packet header of a data packet (such as a first data packet) to be transmitted, to realize that the data packet to be transmitted is directly transmitted between the gateway node and the business server.

The packet header of the first data packet before the tunnel encapsulation includes a first IP address, a destination IP address, a destination port number, and the like.

The packet header of the second data packet after tunnel encapsulation includes an IP address of the gateway node, a destination IP address, and a destination port number of a gateway node, and the like.

The destination IP address and the destination port number of the second data packet are the same as the destination IP address and the destination port number of the first data packet.

The destination IP address is the IP address of the business server corresponding to the request data packet.

A destination port is a port on which a business server can provide a corresponding service.

In some embodiments, tunnel encapsulating the first data packet to obtain the second data packet is performed through a kernel tunnel module of a gateway node. The kernel tunnel module of the gateway node includes a program for completing tunnel encapsulation and tunnel de-encapsulation.

After the first data packet is generated, a forwarding program of the gateway node transfers the first data packet to a kernel tunnel module of the gateway node, and the kernel tunnel module of the gateway node performs tunnel encapsulation on the first data packet to generate a second data packet. In some embodiments, after the first data packet is generated, the forwarding program of the gateway node passes the first data packet to the kernel protocol stack of the gateway node and transmits the first data packet to the kernel tunnel module of the gateway node through the kernel protocol stack of the gateway node. The communication protocol of the kernel protocol stack of the gateway node is relevant. For example, the kernel protocol stack of the gateway node is the kernel TCP protocol stack.

240: Transmit the second data packet to the business server.

In some embodiments, after the kernel tunnel module generates the second data packet, the gateway node sends the second data packet to the business server.

In summary, the gateway node initiates a communication connection to the first data packet using the reserved IP address in the IP address pool and processes the first data packet through tunnel encapsulation, which makes up the problem that the reserved IP address is used as the source IP address of the first data packet so that the first data packet cannot be transmitted to the business server. Without using a routable IP address, it realizes the transmission of a data packet between a gateway node and a business server and saves the cost of transmitting a data packet between a gateway node and a business server.

Meanwhile, compared to the related art in which a gateway node is provided with a plurality of routable IP addresses through a switch, the number of routable IP addresses that the switch can assign is small, and one switch manages a plurality of gateway nodes (for example, 64), it is difficult for the switch to assign a sufficient number of routable IP addresses to all gateway nodes it manages. Since the number of reserved IP addresses is sufficient, so that the IP address pool of the gateway node can have a sufficient number of reserved IP addresses, increasing the total number of long connections that the gateway node can establish with the business server, helping to increase the concurrent connection number of the gateway node, thereby avoiding service damage caused by the insufficient concurrent connection number of the gateway node.

For some scenarios with a high concurrent connection number, for an application layer gateway node, only a small number of communication connections between a client and a business server are needed to easily reach the upper limit of the concurrent connection number of the application layer gateway node, and the product availability using a load balancing communication connection is affected. Using the reserved IP address and the tunnel encapsulation technology, the upper limit of the concurrent connection number of the gateway node can be effectively increased, and the cost required to increase the upper limit of the concurrent connection number of the gateway node is small without using a routable IP address.

The generation process of the second data packet is described below in several embodiments.

In some embodiments, a gateway node performs tunnel encapsulation on a first data packet to obtain a second data packet, including: determining an encapsulation method corresponding to the first data packet according to type information of the first data packet, different type information corresponding to different encapsulation methods; and performing tunnel encapsulation on the first data packet according to the encapsulation method corresponding to the first data packet to obtain the second data packet.

In some embodiments, the generation process of the second data packet is performed in a kernel tunnel module of the gateway node. Optionally, the generation process of the second data packet may also be performed in other modules or programs of the gateway node. In the following embodiments, taking the kernel tunnel module of the gateway node executing the process as an example, the generation process of the second data packet is described.

Before performing tunnel encapsulation, a kernel tunnel module of a gateway node needs to determine the type of a first data packet, and different types of first data packets correspond to different tunnel encapsulation methods. The tunnel encapsulation method corresponding to the first data packet is affected by the type information of the first data packet. In some embodiments, the type information of the first data packet relates to a business server.

The type information of the first data packet may be indicated using an identifier number.

For example, numbers are used to represent. Assuming that there are three types of first data packets, two bit-characters can be used as type information of the first data packet, for example, "01" indicates that the first data packet is type a; for example, "10" indicates that the first data packet is type b; and for example, "11" indicates that the first data packet is type c. It is also possible to use three bit-characters as type information of the first data packet, for example, "001" indicates that the first data packet is type a; for example, "010" indicates that the first data packet is type b; and for example, "100" indicates that the first data packet is type c. The expression form of the first data packet type is determined according to actual situations, such as the data format of the first data packet, and this application is not limited thereto.

In some embodiments, the kernel tunnel module of the gateway node obtains the type information of the first data packet from other programs or modules of the gateway node. For example, the type information of the first data packet is sent to a kernel tunnel module of the gateway node by a forwarding program of the gateway node. In some embodiments, the type information of the first data packet is determined by the gateway node according to the request data packet, as described in the following embodiments.

In other embodiments, the kernel tunnel module of the gateway node may also read the first data packet to obtain type information of the first data packet. In this method, the type information of the first packet is stored in the first data packet. In some embodiments, the type information of the first data packet is stored in a certain field of the first data packet during the generation of the first data packet by the forwarding program of the gateway node.

In some embodiments, the type information of the first data packet is stored in an option field of the first data packet, the option field being used for carrying the self-defining data.

The option field of the first data packet refers to the ip_option field of the first data packet. This field can carry the self-defining data. The ip_option field is used to store the type information of the first data packet so that the kernel tunnel module of the gateway node can obtain the type information of the first data packet only by reading the option field of the first data packet, without performing other calculation processes, and without communicating with other programs or modules in the gateway node so that the obtaining process of the type information of the first data packet is more lightweight and convenient.

The kernel tunnel module determines an encapsulation method corresponding to the first data packet according to the type information of the first data packet. In some embodiments, there is a corresponding relationship between the type information of the first data packet and the encapsulation method. For example, the type information of a data packet corresponds to an encapsulation method. It is assumed that there are two types of first data packets, a first data packet with type information a corresponding to encapsulation method 1 and a first data packet with type information b corresponding to encapsulation method 2.

Since the type information of the first data packet is related to the business server, it is determined to perform corresponding tunnel encapsulation on the first data packet according to the type of the first data packet to obtain a second data packet, so that the second data packet can be successfully received by the corresponding business server. This makes the method applicable to establish communication connections with various types of business servers so that the method has higher universality.

In some embodiments, a gateway node performs tunnel encapsulation on a first data packet according to an encapsulation method corresponding to the first data packet to obtain a second data packet, including: replacing the source IP address of the first data packet in a case that the encapsulation method corresponding to the first data packet belongs to a replacement encapsulation method; generating a packet header of the second data packet according to the encapsulation method corresponding to the first data packet, a source IP address in the packet header of the second data packet being an IP address of the gateway node; and encapsulating the first data packet using the packet header of the second data packet to obtain the second data packet.

Replacing the source IP address of the first data packet refers to changing the source IP address of the first data packet.

In some embodiments, the gateway node replaces the source IP address of the first data packet, including: selecting a conversion IP address corresponding to the first IP address from a conversion network segment, and replacing the first IP address with the conversion IP address as the source IP address of the first data packet, a mapping relationship existing between the conversion network segment and the reserved IP address in the IP address pool; or, replacing the first IP address with an IP address of the client as the source IP address of the first data packet.

A conversion network segment refers to a network segment configured to a gateway node for providing a conversion IP address. There is at least one IP address in the conversion network segment, and in some embodiments, the IP address in the conversion network segment also belongs to the reserved IP address.

The conversion network segment has a mapping relationship with a reserved IP address in the IP address pool of the gateway node. For any reserved IP address in the IP address pool, there is a corresponding conversion IP address in the conversion network segment. Any two reserved IP addresses in the IP address pool are not the same as the conversion IP address.

When it is determined that the encapsulation type corresponding to a certain first data packet needs to replace the source IP address of the first data packet with the conversion IP address (at this moment, the source IP address of the first data packet is the first IP address), the kernel tunnel module obtains the source IP address of the first data packet, determines the conversion IP address corresponding to the source IP address in the conversion network segment, and replaces the first IP address with the conversion IP address as the source IP address of the first data packet.

For example, for a certain first data packet, the first IP address determined in the IP address pool in the forwarding program of the gateway node is 169.254.121.079, namely, the source IP address of the first data packet is 169.254.121.079; and when the kernel tunnel module performs tunnel encapsulation on the first data packet, it is determined that the source IP address of the first data packet needs to be replaced through the conversion IP address. Optionally, the kernel tunnel module determines a conversion IP address corresponding to the first IP address by looking up a mapping relationship table. Assuming the first IP address 169.254.121.079 corresponds to a conversion IP address of 127.121.0.1 in the conversion network segment, the kernel tunnel module uses the conversion IP address 127.121.0.1 as the source IP address of the first data packet.

In some embodiments, where the business server receiving the second data packet sets up to run a particular function on the VM, it may be desirable to look up the conversion IP address in the conversion network segment and replace the first IP address with the conversion IP address as the source IP address of the first data packet.

In some embodiments, the IP address of the client refers to the physical IP address of the client; a communication connection with the client can be made using the IP address of the client. In some embodiments, the gateway node determines the IP address of the client based on the request data packet. For example, when the forwarding program of the gateway node generates the first data packet according to the request data packet, the IP address of the client sending the request data packet is recorded to forward the reply information about the business server to the client in the process of receiving the business server reply data packet.

In some embodiments, where the business server receiving the second data packet is built in the VM, the kernel tunnel module of the gateway node replaces the source IP address of the first data packet with the IP address of the client.

In some embodiments, the source IP address of the first data packet is stored in a packet header of the first data packet, and the kernel tunnel module replaces the source IP address in the packet header of the first data packet with the conversion IP address, or the IP address of the client.

In addition, the kernel tunnel module of the gateway node also generates a packet header of the second data packet according to the information related to the first data packet. In some embodiments, the packet header of the second data packet is used for providing routing information to enable transmission of the encapsulated first data packet over the Internet. The specific content in the packet header of the second data packet is determined according to the actual situation of the requirements of the tunneling protocol, and this application is not defined herein.

In some embodiments, the source IP address in the packet header of the second data packet is an IP address of a gateway node; the destination IP address is an IP address of a business server corresponding to the request data packet; and the destination port is a port on which the business server can provide the corresponding business. For a detailed procedure of determining an IP address of a business server, reference is made to the following embodiments.

In some embodiments, during the packet header of the second data packet, reference information in the kernel tunnel module of the gateway node, information related to the communication connection with the business server, and the like are required in addition to the encapsulation method determined using the type information of the first data packet. The reference information in the kernel tunnel module of the gateway node is used for enabling the second data packet to be transmitted in the kernel tunnel, and the reference information may relate to a tunneling protocol. The information related to the business server is used for enabling the business server to smoothly receive the second data packet. For example, when the business server receiving the second data packet is running in the VM, the packet header of the second data packet may further include the IP address of the mother machine of the VM and the like.

The execution order of a process of replacing a source IP address of a first data packet and a process of generating a second data packet according to an encapsulation method corresponding to the first data packet is determined according to actual situations. For example, a kernel tunnel module of a gateway node may complete a process of replacing a source IP address of a first data packet first, and then generate a packet header of a second data packet, or may first generate a packet header of the second data packet based on an encapsulation method, and replace the source IP address of the first data packet. Alternatively, the process of converting the source IP address of the first data packet and the process of generating the packet header of the second data packet may be performed simultaneously in the kernel tunnel module of the gateway node.

After replacing the source IP address of the first data packet and generating the packet header of the second data packet, the first data packet is re-encapsulated using the packet header of the second data packet. In some embodiments, the process may be understood to take the packet header of the second data packet as the packet header of the whole first data packet, such that the first data packet (meaning the first data packet with the replaced source IP address) becomes the load data of the second data packet.

In other embodiments, the gateway node generates, in case the encapsulation method corresponding to the first data packet does not belong to the replacement encapsulation method, a packet header of the second data packet according to the encapsulation method corresponding to the first data packet, a source IP address in the packet header of the second data packet being an IP address of the gateway node; and encapsulating the first data packet using the packet header of the second data packet to obtain the second data packet, the source IP address of the first data packet keeping the first IP address unchanged.

In some embodiments, the encapsulation method corresponding to the first data packet does not require the replacement of the source IP address of the first data packet. For example, where the business server for receiving the second data packet is established on a physical machine, the kernel tunnel module may perform tunnel encapsulation on the first data packet directly. The encapsulation method of the first data packet is determined according to type information of the first data packet, and the type information of the first data packet relates to the business server.

After generating the packet header of the second data packet, the kernel tunnel module directly uses the packet header of the second data packet to encapsulate the first data packet (at this moment, the source IP address of the first data packet is still the first IP address determined by the forwarding program of the gateway node) to obtain the second data packet. The detailed steps of this process are described with reference to the previous embodiment and will not be further described herein.

The encapsulation method of the first data packet is determined by the type information of the first data packet, and the type information of the first data packet is related to the business server corresponding to the first data packet, so that the second data packet obtained by performing tunnel encapsulation on the first data packet can be successfully received and processed by the corresponding business server, so that the second data packet transmitted by the gateway node is adapted to different business server types, and the universality of the gateway node transmitting the data packet to the business server is improved.

The determination of the type information of the first data packet is described below through several embodiments.

In some embodiments, the gateway node determines the type information of the first data packet according to the type information of the business server, the type information of the business server being related to a way of establishing the business server.

In some embodiments, the manner of establishing a business server refers to an implementation method of the business server, and the type of the business server includes but is not limited to one of the following: a business server established through a physical machine, a business server established through a VM, and a business server established through a function running in the VM.

In some embodiments, the gateway node determines the type information of the first data packet based on the type information of the business server and the type information of the perceptron. The perceptron is used for perceiving one or more ports of the business server. The type information of the perceptron is determined by the kind of communication protocol to which the perceptron belongs, the kind of perceptron including but not limited to one of the following: a secure sockets layer (SSL) perceptron, a hypertext transfer protocol (HTTP) perceptron, and a hypertext transfer protocol secure (HTTPS) perceptron based on the SSL.

In some embodiments, the type information of the first data packet is determined by a forwarding program of the gateway node. The forwarding program of the gateway node may determine the type information of the first data packet either before generating the first data packet or after obtaining the first data packet.

In some embodiments, the forwarding program stores the type information of the first data packet in the first data packet after determining the type information of the first data packet, in such a way that the type information of the first data packet can be passed to the kernel tunnel module when the forwarding program passes the first data packet to the kernel tunnel module. For example, the forwarding program stores the type information of the first data packet in an option field of the first data packet.

In some embodiments, the option field of the first data packet may store, in addition to the type information of the first data packet, information about performing tunnel encapsulation on the first data packet, and information about establishing a communication connection with the business server.

The type information of the first data packet is determined based on the business server corresponding to the first data packet, so that the second data packet obtained by performing tunnel encapsulation on the first data packet can be successfully received and processed by the business server, thereby making the method have a better universality for different types of business servers.

The process of determining the first IP address is described below through several embodiments.

In some embodiments, a gateway node determines a first IP address from an IP address pool according to a request data packet sent by a client, including: determining a business server for processing the request data packet from a plurality of candidate business servers using a scheduling algorithm; and determining the first IP address from the IP address pool according to information about the determined business server.

In some embodiments, after receiving the request data packet sent by the client, the forwarding program of the gateway node determines the domain name that the client needs to access and the service that needs to be performed from the request data packet. For example, the forwarding program obtains request information from the request data packet and obtains the domain name that the client needs to access from the request information.

In some application scenes, business services are provided to clients through a server cluster. In this case, the gateway node needs to determine a business server from the server cluster to provide the business service to the client. In some embodiments, the forwarding program of the gateway node determines a server for processing the request data packet from a plurality of candidate business servers according to a load balancing method.

In some embodiments, the scheduling algorithm refers to a load balancing algorithm. For the specific content of the scheduling algorithm, reference can be made to the above term description, which will not be described in detail herein.

The forwarding program of the gateway node, after determining the business server for processing the request data packet, determines a first IP address from the IP address pool according to the information about the determined business server, binds the first IP address, and opens a connection for the gateway node to forward a data packet related to the request data packet to the server.

During a period, for different request data packets, the corresponding business servers thereof are not completely the same (or different requests in a request data packet), and the first IP addresses corresponding to different request data packets (or different request information in a certain request data packet) in a certain period may be the same or different.

In some embodiments, the information about the business server includes an IP address and a port number of the business server. The gateway node determines a first IP address from an IP address pool according to information about the determined business server, including: processing the IP address and the port number of the business server using a hash algorithm to obtain a hash value; and determining the first IP address from the IP address pool according to the hash value.

In some embodiments, the forwarding program determines the first IP address from the IP address pool according to a hash algorithm. In some embodiments, the IP address of the business server is used for establishing a communication connection with the business server, with different business servers corresponding to different IP addresses. The port number of the business server is used for providing one or more business services, and optionally, a business server has a plurality of ports, different ports being used for providing different business services, and a port number being used for identifying the identity of the port.

In some embodiments, the gateway node uses the IP address and port number of the business server as a key value of the hash algorithm to obtain a corresponding hash value and determines a first IP address from the IP address pool according to the hash value. For example, when the forwarding program performs a hash operation on the IP address and port number of the business server to obtain a hash value of 1, the terminal program takes the reserved IP address with the number 1 in the IP address pool as the first IP address.

In some embodiments, the information about the client needs to be used in addition to the information about the business server in determining the first IP address. For example, in the process of using a hash algorithm to determine a first IP address, a forwarding program performs a hash operation on an IP address and a port number of a business server, and an IP address of a client to obtain a hash value, and determines the first IP address from an IP address pool according to the hash value. For example, if the forwarding program performs a hash operation on the IP address and the port number of the business server, and the IP address of the client to obtain a hash value of 2, the terminal program takes the reserved IP address identified as 2 in the IP address pool as the first IP address.

The determination of the first IP address by the hash algorithm can ensure that the hash value corresponding to the key value does not change, and is helpful to determine the first IP address again in the process of the gateway node forwarding the reply data packet of the business server to the client. After the first IP address is determined by the hash algorithm, the gateway node does not need to store the corresponding relationship between the first IP address and the business server, and can find the first IP address from the IP address pool using the same hash algorithm again according to the information about the business server, which helps to save storage space in the gateway node.

The process of the gateway node receiving the reply data packet sent by the business server for processing is described below.

In some embodiments, the forwarding program of the gateway node stores a corresponding relationship table of the first IP address and the client after receiving the request data packet sent by the client. After the gateway node receives a reply data packet of the response request data packet of the business server, a client corresponding to the reply information can be determined according to the corresponding relationship table, and the reply data (in the form of a data packet) is forwarded to the client; for the specific process, reference can be made to the following embodiments.

In some embodiments, after the gateway node sends the second data packet to the business server, it further includes: receiving a reply data packet corresponding to the second data packet and transmitted by the business server; performing tunnel de-encapsulation on the reply data packet to obtain a response data packet; determining the first IP address according to a destination IP address of the response data packet; determining the client according to the first IP address; and generating a feedback data packet based on content in the response data packet, a destination IP address of the feedback data packet being an IP address of the client.

In the case where the gateway node and the business server have established a communication connection, after receiving the second data packet sent by the gateway node, the business server processes the second data packet, responds to the request information in the second data packet, and sends a reply data packet (namely, a reply data packet) to the gateway node.

In some embodiments, the reply data packet is transmitted using the same tunneling protocol as the second data packet. The reply data packet is transmitted in the Internet through the routing information provided by the packet header of the reply data packet. The source IP address in the packet header of the reply data packet is the IP address of the business server, and the destination IP address is the IP address of the gateway node.

After receiving the reply data packet, the gateway node needs to perform tunnel de-encapsulation on the reply data packet. In some embodiments, the reply data packet is performed with tunnel de-encapsulation by a kernel tunnel module of a gateway node, and a packet header of the reply data packet is removed to obtain a response data packet.

In some embodiments, the kernel tunnel module of the gateway node passes the response data packet to the forwarding program of the gateway node. The response data packet is processed by a forwarding program. Since the destination IP address of the response data packet is the source IP address of the first data packet obtained by the business server performing de-encapsulation on the received second data packet, the gateway node may replace the source IP address of the first data packet in the process of generating the second data packet; at this moment, the destination IP address in the response data packet may not be the first IP address determined in the IP address pool by the forwarding program of the gateway node, and it is necessary for the kernel tunnel module of the gateway node to determine the type of the first IP address of the response data packet.

In this case, the kernel tunnel module of the gateway node determines the first IP address according to the destination IP address of the response data packet. In some embodiments, the gateway node determines a first IP address according to the destination IP address of the response data packet, including: determining the destination IP address of the response data packet as the first IP address in a case that the destination IP address of the response data packet is the first IP address; determining a target IP address according to the conversion IP address and a mapping relationship between the conversion IP address and a first IP address in a case that a destination IP address of a response data packet is a conversion IP address in a conversion network segment; and using a hash algorithm to determine the corresponding first IP address in a case that the destination IP address of the response data packet is the IP address of the client.

In some embodiments, the gateway node determines the first IP address according to the conversion IP address and a mapping relationship between the conversion IP address and a first IP address, including: determining a first IP address corresponding to the conversion IP address by looking up a mapping relationship table.

In some embodiments, the gateway node determines a corresponding first IP address using a hash algorithm, including: using a hash algorithm to process an IP address and a port number of a business server to obtain a hash value, and determining a first IP address from an IP address pool according to the hash value; or, using a hash algorithm to process an IP address of a business server, a port number of the business server, and an IP address of a client to obtain a hash value, and determining a first IP address from an IP address pool according to the hash value. The specific method is similar to the process of the conversion program of the gateway node determining the first IP address from the IP address pool and will not be described in detail herein.

In this process, the gateway node uses the same hash algorithm as the forwarding program of the gateway node first determining the first IP address from the IP address pool.

In some embodiments, the kernel tunnel module of the gateway node replaces the destination IP address of the response data packet with the first IP address after determining the first IP address based on the destination IP address of the response data packet. The response data packet is delivered to a forwarding program of the gateway node. The forwarding program determines the IP address of the client through the first IP address. The gateway node generates a feedback data packet according to the response data packet; the source IP address of the feedback data packet is the IP address of the gateway node, and the destination IP address is the IP address of the client. The gateway node sends a feedback data packet to the client.

In other embodiments, where the kernel tunnel module of the gateway node determines that the destination IP address of the response data packet is the IP address of the client, the response data packet may be directly delivered to the forwarding program; and the gateway node takes the destination IP address of the response data packet as the destination IP address of the feedback data packet and sends the feedback data packet to the client.

In other embodiments, after the gateway node sends the second data packet to the business server, it further includes: receiving a reply data packet corresponding to the second data packet and transmitted by the business server; performing tunnel de-encapsulation on the reply data packet to obtain a response data packet; determining the first IP address according to a destination IP address of the response data packet; and replacing the destination IP address of the response data packet with the first IP address, generating an acknowledgment data packet according to the response data packet, and sending the acknowledgment data packet to the business server.

In the case where the gateway node and the business server are establishing a communication connection, the gateway node receives a reply data packet sent by the business server, processes the reply data packet (for the specific process, reference can be made to the above embodiment, which will not be described in detail herein), and generates an acknowledgment data packet by a kernel protocol stack of the gateway node, and sends same to the business server after tunnel encapsulation is performed on the acknowledgment data packet.

This process is similar to the process of a gateway node sending a second data packet to a business server, and this application will not be described in detail herein.

The process of obtaining an IP address in a gateway node is described below.

In some embodiments, the data packet transmission method also includes: obtaining, by a gateway node, the IP address pool allocated by a global management and control node, the global management and control node being used for applying for the reserved IP addresses in batches, creating at least one IP address pool, and allocating the IP address pool for at least one gateway node; writing at least one of the reserved IP addresses in the IP address pool into an IP address configuration table; reading the reserved IP address from the IP address configuration table; and adding the read reserved IP address to the gateway node.

In some embodiments, the global management and control node is used for allocating an IP address pool for at least one gateway node. Before allocating an IP address for a gateway node, a global management and control node applies for several reserved IP addresses in batches from a global IP address pool (equivalent to a database). Optionally, the global management and control node runs on a device different from the gateway node.

In some embodiments, the global management and control node allocates an IP address pool for gateway nodes in different regions; there is at least one gateway node in a region, and IP address pools allocated to different gateway nodes are not conflicting.

In some embodiments, that the IP address pools allocated to different gateway nodes are not conflicting means that: There is no same reserved IP address in the IP address pool for any two gateway nodes belonging to the same region and no same reserved IP address in the IP address pool for any two gateway nodes belonging to different regions.

That is, after the global management and control node applies for a plurality of reserved IP addresses in batches from the global IP address pool, an IP address pool is formed by these reserved IP addresses, and no duplicate reserved IP addresses exist in any two IP address pools. This method can completely avoid the collision caused by different gateway nodes selecting the same reserved IP address to initiate access to the same business server and improve the reliability of the communication connection between the gateway node and the business server.

In other embodiments, that the IP address pools allocated to different gateway nodes are not conflicting means that there is no same reserved IP address in the IP address pool for any two gateway nodes belonging to the same region, and the same reserved IP address is allowed to exist in the IP address pool for any two gateway nodes belonging to different regions.

That is, after the global management and control node applies for a plurality of reserved IP addresses in batches from the global IP address pool, when allocating an IP address pool for a gateway node in a certain region, these reserved IP addresses are used to generate a non-duplicated IP address pool for the region, and when allocating an IP address pool for a gateway node in a certain region, the plurality of reserved IP addresses are used to generate a non-duplicated IP address pool. In some scenes where there is a low possibility of collision between clients in different regions, the number of reserved IP addresses can be reduced and the utilization of the reserved IP addresses can be improved.

In some embodiments, the number of the reserved IP addresses in the plurality of IP address pools assigned by the global management and control node is the same. In this case, the number of the reserved IP addresses that can be used by a plurality of gateway nodes is the same. Providing the gateway node with the IP address pool results in a more uniform promotion of the concurrent connection number of the gateway node, which is beneficial to the distribution of business traffic in a load balancing scenario.

In other embodiments, the number of reserved IP addresses in the plurality of IP address pools assigned by the global management and control node is not exactly the same. Optionally, the global management and control module may allocate a gateway node in the region with heavy businesses to an IP address pool with more reserved IP addresses. Making the process of configuring an IP address pool for a gateway node by a global management and control module more flexible, while avoiding idling reserved IP addresses.

In some embodiments, after the gateway node obtains the IP address pool allocated by the global management and control node, the reserved IP address in the IP address pool needs to be pre-processed, so that the gateway node can directly use the reserved IP address, reducing the time required for processing the reserved IP address, to reduce the response speed of the gateway node to the request data packet.

In some embodiments, the IP address pool assigned by the global policing module is obtained by an IP address manager in the gateway node. At least one reserved IP address in the IP address pool is written into the IP address configuration table via a local loop interface in the gateway node. The IP address configuration table is read by the forwarding program of the gateway node. The forwarding program of the gateway node then adds the read reserved IP address to the gateway node. In some embodiments, the forwarding program of the gateway node picks up the reserved IP addresses according to the ip addr command so that these reserved IP addresses are in a state usable by the gateway node.

Figure 3:
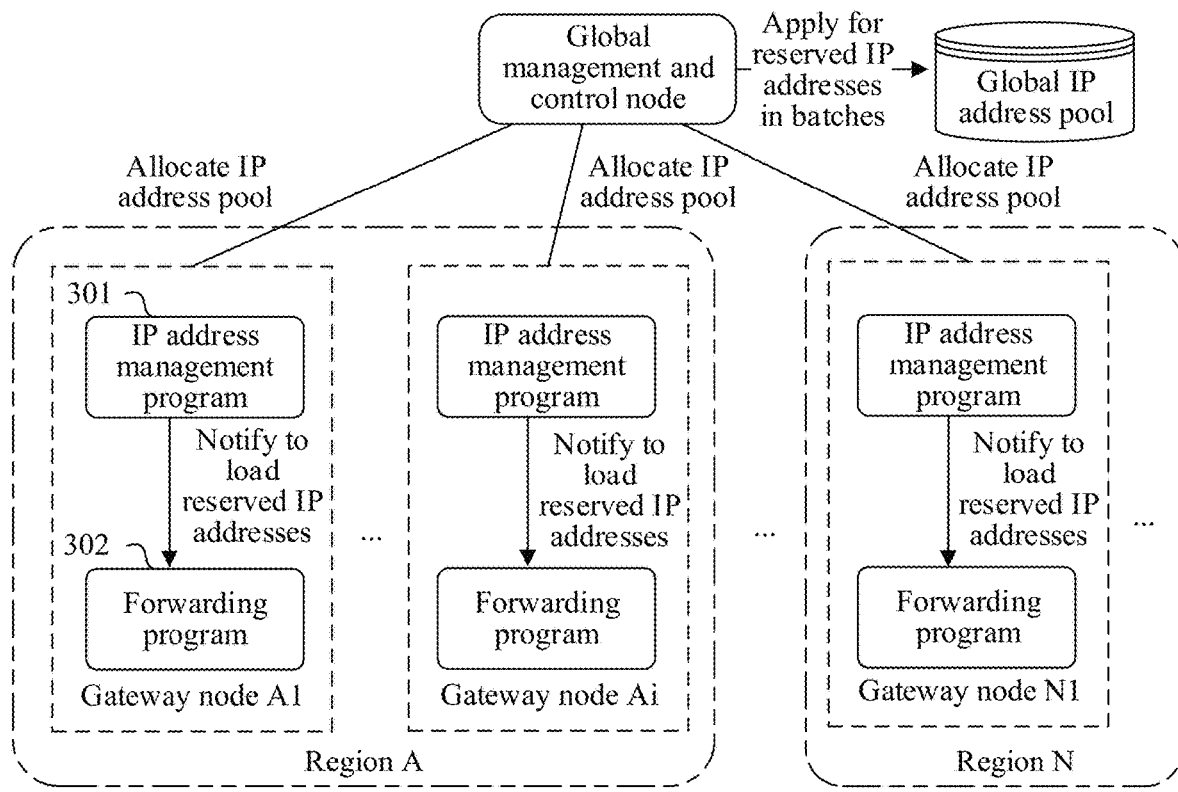
FIG. 3 is a diagram of an obtaining method of an IP address pool provided by an exemplary embodiment of this application.

As shown in FIG. 3, a global management and control node applies for reserved IP addresses in batches from a global IP address pool, and allocates an IP address pool to gateway nodes A1, . . . , Ai in a region A, a gateway node in a region B (not shown in FIG. 3), and gateway nodes such as a gateway node N1 in the region N. Taking the gateway node A1 as an example, after obtaining the IP address pool, the IP address management program 301 in the gateway node A1 writes the reserved IP address into the IP address configuration table, and notifies the forwarding program 302 of the gateway node to load the reserved IP addresses. The forwarding program 302 of the gateway node adds the reserved IP address read from the IP address configuration table.

In this method, the reserved IP addresses do not need to participate in the transmission process in the Internet, that is, only the gateway node needs to perceive the reserved IP addresses in its corresponding IP address pool. Therefore, after the gateway node obtains the IP address pool, pre-processing the reserved IP address can be completed by completing the loading of the reserved IP address in the IP address pool, so that the gateway node binds the reserved IP address at any time to initiate a connection, thereby dynamically extending the reserved IP address which can be used by the gateway node, thereby achieving the effect of dynamically extending the concurrent connection number of the gateway node. Particularly, for some gateway nodes which already have business traffic, there is no need to restart the gateway node, the loss of business traffic in the gateway node can be avoided, and the reliability of communication connection with the gateway node is improved.

In some embodiments, the gateway node confirms the availability of reserved IP addresses in the IP address pool. In some embodiments, after determining the first IP address, the forwarding program of the gateway node checks the availability of the first IP address. If the forwarding program of the gateway node determines that the first IP address is normally applicable, the first IP address is taken as the source IP address of the first data packet. If the forwarding program of the gateway node determines that if the first IP address is not available (for example, the first IP address is removed by the gateway node), the forwarding program of the gateway node establishes a connection using the IP address of the gateway node (the IP address is a physical IP address), that is, in this case the source IP address of the first data packet is the IP address of the gateway node.

Through the above method, the gateway node has a certain automatic disaster tolerance capability, so that the gateway node has a high availability.

In some embodiments, the data packet transmission method also includes: obtaining, by the gateway node, a connection number within a target period, the connection number referring to the number of communication connections between the client carried by the gateway node and the business server; transmitting the connection number to a scheduling decision node; and receiving an extended IP address pool transmitted by a global management and control node in a case that the connection number is greater than or equal to a threshold, the extended IP address pool including at least one newly added reserved IP address.

The scheduling decision node is used for determining whether to newly add a reserved IP address for the gateway node. The scheduling decision node and the global management and control node can be deployed on the same device or can be deployed on two different devices.

In some embodiments, the connection number in the target period is obtained by a counting program in the gateway node. After obtaining the connection number, the gateway node reports the connection number to the scheduling decision node, and the scheduling decision node receives the connection number reported by the gateway node, and determines whether the connection number exceeds the threshold. In the case where the connection number exceeds the threshold, the scheduling decision node notifies the global management and control node to send an extended IP address pool for the gateway node corresponding to the connection number.

In some embodiments, to avoid business corruption, the threshold is less than the maximum connection number that the gateway node can load. For example, the maximum connection number of the gateway node is 300,000, and the threshold can be set to be 280,000; by setting the threshold to be less than the maximum connection number that the gateway node can load, it can be avoided as far as possible that the connection number exceeds the maximum connection number that the gateway node can load in the process of reporting the connection number to the scheduling decision node→the scheduling decision node responds.

In some embodiments, the gateway node reports the connection number to the scheduling decision node at fixed time intervals. For example, the gateway node reports the connection number to the scheduling decision node once every 1 minute. In other embodiments, the gateway node determines an opportunity to report the connection number to the scheduling decision node based on changes in the connection number. For example, the gateway node stores the connection number 1 obtained in the last target period, and after obtaining the connection number 2 corresponding to the current target period, the gateway node determines the transformation condition of the connection number according to the connection number 1 and the connection number 2. For example, in the case where the gateway node determines that the change situation of the connection number belongs to the growth state, and the growth speed is fast, the gateway node shortens the opportunity to report the connection number to the scheduling decision module.

In some embodiments, the reserved addresses in the ongoing IP address pool are preprocessed after the gateway node has obtained the extended IP address pool, as described above with reference to the embodiments, and will not be described in detail herein.

Figure 4:
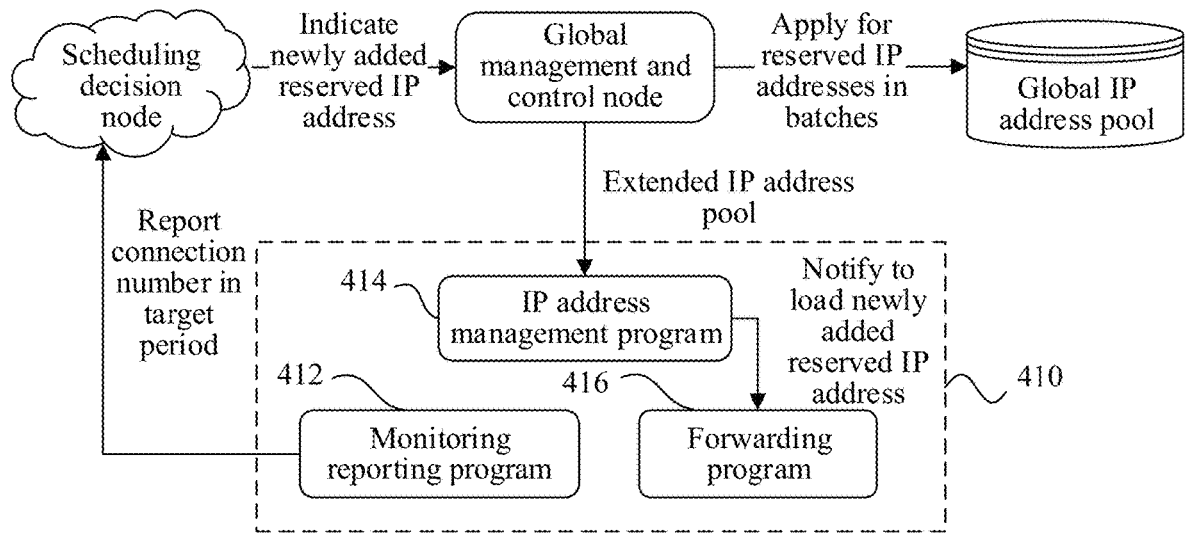
FIG. 4 is a diagram of a process of a gateway node obtaining an expanded IP address pool provided by an exemplary embodiment of this application.

As shown in FIG. 4, a diagram of a process of a gateway node obtaining an expanded IP address pool is shown. A monitoring reporting program 412 of a gateway node 410 obtains the connection number loaded by the gateway node 410; the gateway node 410 reports the connection number to a scheduling decision node; the scheduling decision node determines whether the connection number exceeds a threshold; and in the case where the scheduling decision node determines that the connection number is greater than or equal to the threshold, the scheduling decision node indicates a global management and control node to provide a newly added reserved IP address for the gateway node 410. After receiving an indication from the scheduling decision module, the global management and control node allocates an extended IP address pool for the gateway node 410. An IP address management program 414 of the gateway node, after receiving the extended IP address pool, notifies the forwarding program 416 to load the newly added reserved IP address. For the detailed process, reference is made to the above embodiments, which will not be described in detail.

Through the above method, an IP address pool is dynamically configured for a gateway node, and in the case of a large change in the connection number, the connection capability of the gateway node can be expanded in time, to improve the adaptability of the gateway node to different application scenes and avoid business damage.

Figure 5:
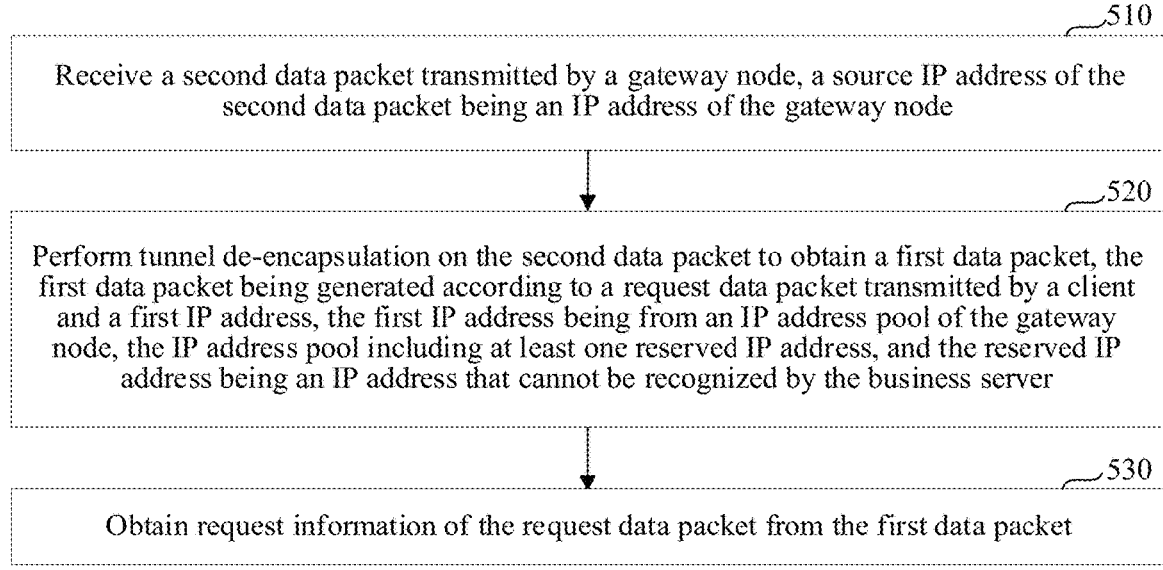
FIG. 5 is a flowchart of a data packet transmission method provided by an exemplary embodiment of this application.

FIG. 5 is a flowchart of a data packet transmission method provided by an exemplary embodiment of this application. Illustratively, the performing subject of the method may be the business server 30 shown in FIG. 1. As shown in FIG. 5, the method may include the following processes (510 to 530):

510: Receive a second data packet transmitted by a gateway node, a source IP address of the second data packet being an IP address of the gateway node.

The business server receives the second data packet sent by the gateway node, and reference is made to the embodiment of the gateway node side for the relevant content of the second data packet, which will not be described in detail herein.

520: Perform tunnel de-encapsulation on the second data packet to obtain a first data packet, the first data packet being generated according to a request data packet transmitted by a client and a first IP address, the first IP address being from an IP address pool of the gateway node, the IP address pool including at least one reserved IP address, and the reserved IP address being an IP address that cannot be recognized by the business server.

In some embodiments, the tunnel de-encapsulation on the second data packet is performed in a kernel tunneling module of the business server. The kernel tunnel module of the business server contains programs for tunnel encapsulation and tunnel de-encapsulation. A first data packet obtained by performing tunnel de-encapsulation on a second data packet is a first data packet after performing tunnel encapsulation via a tunnel module of a gateway node. With reference to the embodiment of the gateway node side, the source IP address in the first data packet may not be the first IP address. For the relevant description of the first data packet, reference is made to the embodiment of the gateway node side, and this application will not be described in detail herein.

530: Obtain request information of the request data packet from the first data packet.

In summary, since the concurrent connection number is determined according to four factors, namely, the number of source IP addresses, the number of source IP ports, the number of destination IP addresses, and the number of destination ports, without changing the other three factors, an IP address pool is allocated to a gateway node, and the number of IP addresses which can be used by the gateway node is increased, which is equivalent to increasing the number of source IP addresses and helping to improve the concurrent connection number. The first data packet is processed by the tunnel encapsulation technology, which makes up the problem that the reserved IP address is used as the source IP address of the first data packet so that the first data packet cannot be transmitted to the business server.

In some embodiments, after obtaining request information of a request data packet from a first data packet, the business server further includes: generating a response data packet based on the request information, a corresponding relationship existing between five-tuple information of the response data packet, and five-tuple information of the first data packet; obtaining a connection relationship, the connection relationship being used for indicating the gateway node transmitting the second data packet; determining the IP address of the gateway node according to the connection relationship; performing tunnel encapsulation on the response data packet according to the IP address of the gateway node to obtain a reply data packet, a destination IP address of the reply data packet being the IP address of the gateway node; and transmitting the reply data packet to the gateway node.

The five-tuple information in the response data packet refers to a source IP address, a source port number, a destination IP address, a destination port number, and a communication protocol identification. According to the five-tuple information, both parties in the communication connection can complete data packet transmission.

The corresponding relationship between the five-tuple information of the response data packet and the five-tuple information of the first data packet means that a source IP address and a source port number in the response data packet are a destination IP address and a destination port number of the first data packet; the destination IP address and the destination port number in the response data packet are the source IP address and the source port number of the first data packet, and the communication protocol identification in the response data packet is the same as the communication protocol identification in the first data packet.

The connection relationship is used for indicating a gateway node corresponding to the at least one second data packet received by the business server.

In some embodiments, after the kernel tunnel module of the business server performs tunnel de-encapsulation to obtain a first data packet, the kernel tunnel module of the business server delivers the first data packet to the business service program of the business server, and the business service program of the business server obtains request information for the request data packet from the first data packet. A response data packet is generated based on the request information. In some embodiments, the business service program is referred to as a kernel protocol stack.

The source IP address of the response data packet is the IP address of the business server, and the destination IP address is the source IP address of the first data packet (the source IP address of the first data packet after source IP address replacement is performed, or the first IP address without source IP address replacement).

A business service program of a business server transmits a response data packet to a kernel tunnel module of the business server; the kernel tunnel module determines an IP address of a gateway node according to a connection relationship, and performs tunnel encapsulation on the response data packet according to the IP address of the gateway node to obtain a reply data packet. The business server sends a reply data packet to the gateway node.

In some embodiments, the business server determines an IP address of a gateway node according to a connection relationship, including: obtaining the five-tuple information of the response data packet; and determining the IP address of the gateway node from the connection relationship according to the five-tuple information of the response data packet.

For details not disclosed at the business server side, reference is made to a method embodiment at the gateway node side, which will not be described in more detail.

A method for determining the connection relationship is described below.

In some embodiments, the data packet transmission method also includes: obtaining, by the business server, five-tuple information of the first data packet; and storing the five-tuple information of the first data packet and the IP address of the gateway node in a connection relationship using a hash algorithm, the five-tuple information of the first data packet serving as a hash key value, and the IP address of the gateway node serving as a hash value.

After performing de-encapsulation on the second data packet to obtain a first data packet, the business server establishes the association between the five-tuple information of the first data packet and the IP address of the gateway node via a hash algorithm, and stores the association between the five-tuple information of the first data packet and the IP address of the gateway node in a connection relationship.

Figure 6:
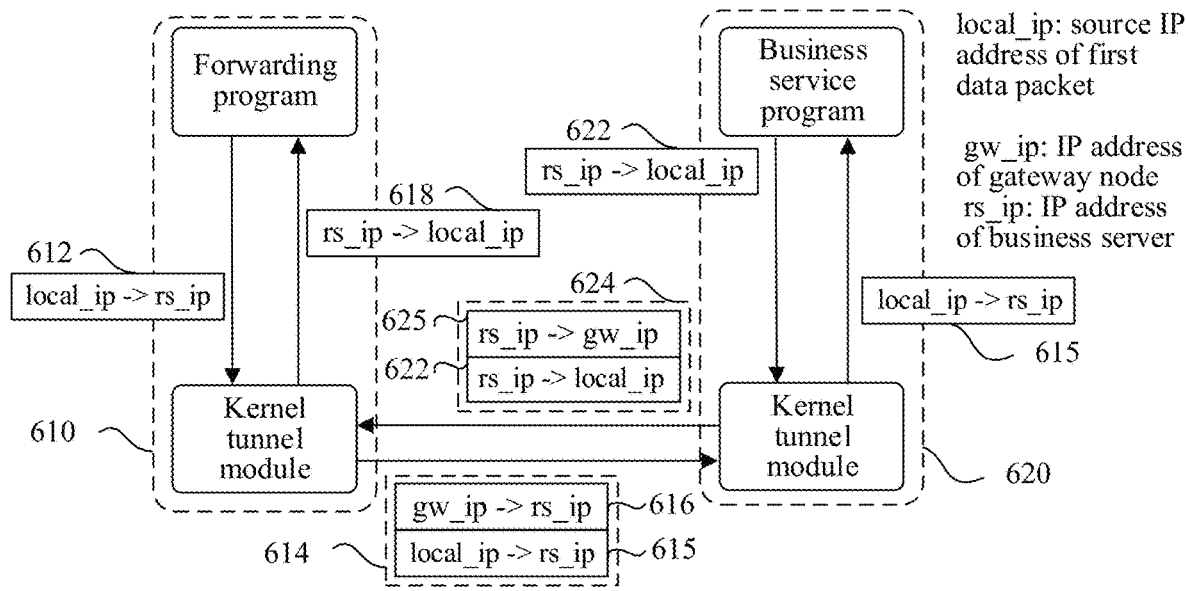
FIG. 6 is a diagram of a process of data packet transmission between a gateway node and a business server provided by an exemplary embodiment of this application.

As shown in FIG. 6, a process of data packet transmission between a gateway node and a business server is shown.

After the gateway node 610 obtains a business data packet sent by a client, a forwarding program of the gateway node 610 generates a first data packet 612 (a source address is a first IP address, and a destination IP address is a business server) according to a request data packet (not shown in FIG. 6); the forwarding program of the gateway node 610 transfers the first data packet 612 to a kernel tunnel module of the gateway node 610; and tunnel encapsulation is performed on the first data packet 612 via the kernel tunnel module to obtain a second data packet 614; the source IP address in the packet header 616 of the second data packet is the IP address of the gateway node 610, and the destination IP address is the IP address of the business server 620. The second data packet 614 includes a tunnel-encapsulated first data packet 615, and optionally, the source IP address of the first data packet 612 differs from the source IP address of the tunnel-encapsulated first data packet 615. The gateway node 610 sends a second data packet 614 to the business server 620.

The business server 620 receives the second data packet 614. The second data packet 614 is performed with de-encapsulation by the kernel tunnel module of the business server 620 to obtain a tunnel-encapsulated first data packet 615, and a response data packet 622 is generated by a business service program in the business server 620. The source IP address of the response data packet 622 is the IP address of the business server and the destination IP address is the source IP address of the tunnel-encapsulated first data packet 615. The business service program of the business server 620 passes the response data packet 622 to the kernel tunnel module of the business server 620. The kernel tunnel module of the business service 620 performs tunnel encapsulation on the response data packet 622 to obtain a reply data packet 624. The source IP address of the packet header 625 of the reply data packet 624 is the IP address of the business server, and the destination IP address is the IP address of the gateway node 610.

The business server 620 sends a reply data packet 624 to the gateway node 610. After obtaining the reply data packet 624, the kernel module of the gateway node 610 performs de-encapsulation on the reply data packet 624 to obtain a response data packet 622. Secondly, the kernel tunnel module of the gateway node 610 selectively replaces the destination IP address of the response data packet 622 to obtain a processed response data packet 618, and sends the processed response data packet 618 to the forwarding program of the gateway node 610.

The method can be adapted to packet transport processes based on TCP, HTTP, HTTPS, and other communication protocols based on the TCP protocol. At the same time, for the process of establishing a communication connection between a gateway node and a business server, the process of transmitting a service-related data packet between the gateway node and the business server can all be applicable.

For a scene where a gateway node transmits a data packet with a business server, such as a scene with a high concurrent connection number, the concurrent connection number between the gateway node and the business server is greatly improved using a reserved IP address through a combination of an application layer (including a forwarding program) of the gateway node and a kernel tunnel module. Furthermore, the upper limit of the concurrent connection number is dynamically expanded and the effect of elastic expansion is achieved.

It should be noted that the above embodiments relating to method for determining a first IP address, a method for generating a first data packet, a method for determining type information of the first data packet, and a method for performing tunnel encapsulation on the first data packet can be freely combined.

The following are apparatus embodiments of this application that may be used for performing method embodiments of this application. For details not disclosed in the apparatus embodiments of this application, reference is made to the method embodiments of this application.

Figure 7:
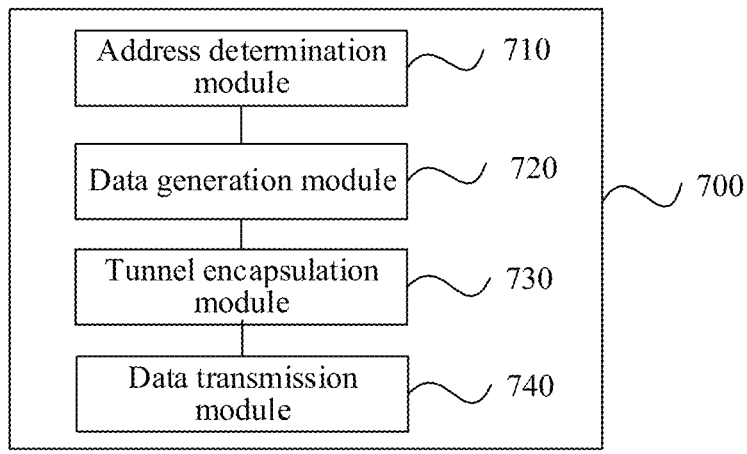
FIG. 7 is a block diagram of a data packet transmission apparatus provided by an exemplary embodiment of this application.

FIG. 7 shows a block diagram of a data packet transmission apparatus provided by an exemplary embodiment of this application. The apparatus may be implemented in software, hardware, or a combination of both as all or part of the gateway node described above. The apparatus 700 may include an address determination module 710, a data generation module 720, a tunnel encapsulation module 730, and a data transmission module 740.

The address determination module 710 is configured to determine a first IP address from an IP address pool according to a request data packet transmitted by a client, the IP address pool including at least one reserved IP address, and the reserved IP address being an IP address that cannot be recognized by a business server.

The data generation module 720 is configured to generate a first data packet according to the request data packet and the first IP address, a source IP address of the first data packet being the first IP address.

The tunnel encapsulation module 730 is configured to perform tunnel encapsulation on the first data packet to obtain a second data packet, the second data packet including content of the first data packet.

The data transmission module 740 is configured to transmit the second data packet to the business server.

In some embodiments, the tunnel encapsulation module 730 includes: an encapsulation method determination submodule, configured to determine an encapsulation method corresponding to the first data packet according to type information of the first data packet, different type information corresponding to different encapsulation methods; and a data packet encapsulation submodule, configured to perform tunnel encapsulation on the first data packet according to the encapsulation method corresponding to the first data packet to obtain the second data packet.

In some embodiments, the data packet encapsulation submodule includes: an address replacement unit, configured to replace the source IP address of the first data packet in a case that the encapsulation method corresponding to the first data packet belongs to a replacement encapsulation method; a packet header generation unit, configured to generate a packet header of the second data packet according to the encapsulation method corresponding to the first data packet, a source IP address in the packet header of the second data packet being an IP address of the gateway node; and a data packet encapsulation unit, configured to encapsulate the first data packet using the packet header of the second data packet to obtain the second data packet.

In some embodiments, the data packet encapsulation submodule includes: a packet header generation unit, configured to generate a packet header of the second data packet according to the encapsulation method corresponding to the first data packet, a source IP address in the packet header of the second data packet being an IP address of the gateway node; and a data packet encapsulation unit, configured to encapsulate the first data packet using the packet header of the second data packet to obtain the second data packet.

In some embodiments, the address replacement unit is configured to: select a conversion IP address corresponding to the first IP address from a conversion network segment, and replace the first IP address with the conversion IP address as the source IP address of the first data packet, a mapping relationship existing between the conversion network segment and the reserved IP address in the IP address pool; or, replace the first IP address with an IP address of the client as the source IP address of the first data packet.

In some embodiments, the apparatus 700 further includes a type determination module for determining the type information of the first data packet according to type information of the business server, the type information of the business server being related to a way of establishing the business server.

In some embodiments, the type information of the first data packet is stored in an option field of the first data packet, the option field being used for carrying the self-defining data.

In some embodiments, the address determination module 710 includes: a server determination submodule, configured to determine a business server for processing the request data packet from a plurality of candidate business servers using a scheduling algorithm; and an address determination submodule, configured to determine the first IP address from the IP address pool according to information about the determined business server.

In some embodiment, the information about the business server includes an IP address and a port number of the business server. The address determination submodule is configured to: process the IP address and the port number of the business server using a hash algorithm to obtain a hash value; and determine the first IP address from the IP address pool according to the hash value.

In some embodiments, the apparatus 700 further includes: a reply data packet receiving module, configured to receive a reply data packet corresponding to the second data packet and transmitted by the business server; and a reply data packet processing module, configured to: perform tunnel de-encapsulation on the reply data packet to obtain a response data packet; determine the first IP address according to a destination IP address of the response data packet; determine the client according to the first IP address; and generate a feedback data packet based on content in the response data packet, a destination IP address of the feedback data packet being an IP address of the client.

In some embodiments, the apparatus 700 further includes an address pre-processing module, configured to: obtain the IP address pool allocated by a global management and control node, the global management and control node being used for applying for the reserved IP addresses in batches, creating at least one IP address pool, and allocating the IP address pool for at least one gateway node; write at least one of the reserved IP addresses in the IP address pool into an IP address configuration table; read the reserved IP address from the IP address configuration table; and add the read reserved IP address to the gateway node.

In some embodiments, the apparatus 700 further includes a counting reporting module, configured to: obtain a connection number within a target period, the connection number referring to the number of communication connections between the client carried by the gateway node and the business server; transmit the connection number to a scheduling decision node; and receive an extended IP address pool transmitted by a global management and control node in a case that the connection number is greater than or equal to a threshold, the extended IP address pool including at least one newly added reserved IP address.

Figure 8:
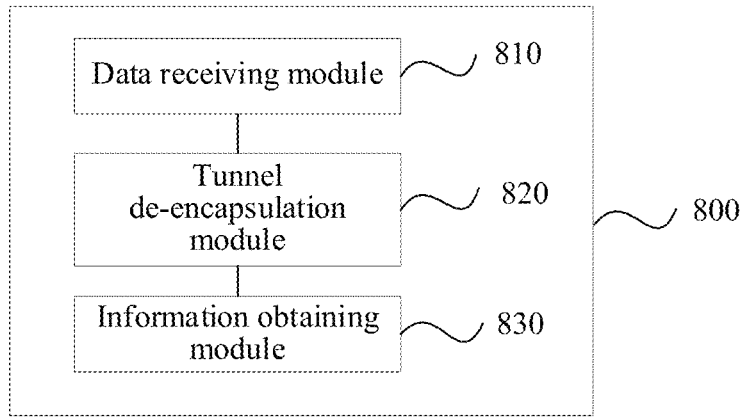
FIG. 8 is a block diagram of a data packet transmission apparatus provided by an exemplary embodiment of this application.

FIG. 8 shows a block diagram of a data packet transmission apparatus provided by an exemplary embodiment of this application. The apparatus may be implemented in software, hardware, or a combination of both as all or part of the business server described above. The apparatus 800 may include a data receiving module 810, a tunnel de-encapsulation module 820, and an information obtaining module 830.

The data receiving module 810 is configured to receive a second data packet transmitted by a gateway node, a source IP address of the second data packet being an IP address of the gateway node.

The tunnel de-encapsulation module 820 is configured to perform tunnel de-encapsulation on the second data packet to obtain a first data packet, the first data packet being generated according to a request data packet transmitted by a client and a first IP address, the first IP address being from an IP address pool of the gateway node, the IP address pool including at least one reserved IP address, and the reserved IP address being an IP address that cannot be recognized by the business server.

The information obtaining module 830 is configured to obtain request information of the request data packet from the first data packet.

In some embodiments, the apparatus 800 further includes: a first data packet generation module, configured to generate a response data packet based on the request information, a corresponding relationship existing between five-tuple information of the response data packet and five-tuple information of the first data packet; a relationship obtaining module, configured to obtain a connection relationship, the connection relationship being used for indicating the gateway node transmitting the second data packet; an address determination module, configured to determine the IP address of the gateway node according to the connection relationship; a second data packet generation module, configured to perform tunnel encapsulation on the response data packet according to the IP address of the gateway node to obtain a reply data packet, a destination IP address of the reply data packet being the IP address of the gateway node; and a data packet transmission module, configured to transmit the reply data packet to the gateway node.

In some embodiments, the address determination module is configured to: obtain the five-tuple information of the response data packet; and determine the IP address of the gateway node from the connection relationship according to the five-tuple information of the response data packet.

In some embodiments, the apparatus 800 further includes: a relationship establishment module, configured to: obtain five-tuple information of the first data packet; and store the five-tuple information of the first data packet and the IP address of the gateway node in a connection relationship using a hash algorithm, the five-tuple information of the first data packet serving as a hash key value, and the IP address of the gateway node serving as a hash value.

It should be noted that when the apparatus provided in the above embodiments implements the functions, only division of the above function modules is used as an example for description. In the practical application, the functions may be allocated to and completed by different function modules according to requirements. That is, an internal structure of the device is divided into different function modules, to complete all or some of the functions described above. Benefits of the apparatus provided by the above embodiments are described with reference to method-side embodiments will not be repeated here.

Figure 9:
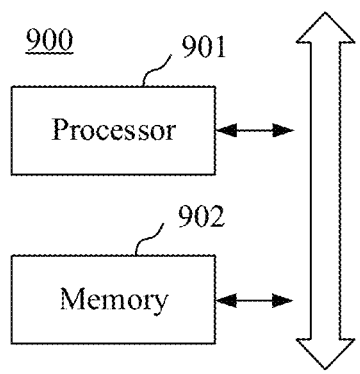
FIG. 9 is a structural block diagram of a computer device provided by an exemplary embodiment of this application.

FIG. 9 shows a structural block diagram of a computer device provided by one exemplary embodiment of this application.

Generally, the computer device 900 includes a processor 901 and a memory 902.

The processor 901 may include one or more processing cores, for example, a 4-core processor or an 8-core processor. The processor 901 may be implemented in at least one hardware form of a digital signal processing (DSP), a field-programmable gate array (FPGA), and a programmable logic array (PLA). The processor 901 may further include a main processor and a co-processor, the main processor being a processor for processing data in a wake-up state, also referred to as a central processing unit (CPU), and a co-processor being a low-power processor for processing data in a standby state. In some embodiments, the processor 901 may be integrated with a graphics processing unit (GPU), the GPU being configured to render and draw the content required by a display screen. In some embodiments, the processor 901 may further include an artificial intelligence (AI) processor, the AI processor being configured to process computing operations related to machine learning.

The memory 902 may include one or more computer-readable storage media which may be tangible and non-transitory. The memory 902 may further include a high-speed random-access memory and a nonvolatile memory, for example, one or more disk storage devices or flash storage devices. In some embodiments, a non-transitory computer-readable storage medium in memory 902 stores a computer program that is loaded and executed by the processor 901 to implement the data packet transmission method provided by the embodiments of the above methods.

The embodiments of this application also provide a computer-readable storage medium storing computer programs, the computer programs being loaded and executed by a processor to implement the data packet transmission method provided by the embodiments of the above methods.

The computer-readable medium may include a computer storage medium and a communication medium. The computer storage medium includes volatile and non-volatile media, and removable and non-removable media implemented using any method or technology for storing information such as computer-readable instructions, data structures, program modules, or other data. The computer storage media include a random-access memory (RAM), a read-only memory (ROM), an erasable programmable read-only memory (EPROM), an electrically erasable programmable read-only memory (EEPROM), a flash memory or other solid-state storage technology, CD-ROM, high-density digital video disc (DVD) or other optical storage, cassette, magnetic tape, disk storage, or other magnetic storage device. Certainly, the skilled in art can know that the computer storage medium is not limited to the above several types.

The embodiments of this application further provide a computer program product including computer instructions stored in a computer-readable storage medium, a processor reading and executing the computer instructions from the computer-readable storage medium to implement the data packet transmission method provided by the embodiments of the above methods.

What is claimed is:

1. A data packet transmission method performed by a gateway node and comprising:
    determining a first Internet protocol (IP) address from an IP address pool according to a request data packet transmitted by a client, the IP address pool including one or more reserved IP addresses not recognizable by a business server;
    generating a first data packet according to the request data packet and the first IP address, the first IP address being a source IP address of the first data packet;
    performing tunnel encapsulation on the first data packet to obtain a second data packet, the second data packet including content of the first data packet; and
    transmitting the second data packet to the business server.

2. The method according to claim 1, wherein performing tunnel encapsulation on the first data packet to obtain the second data packet includes:
    determining an encapsulation method corresponding to the first data packet according to type information of the first data packet, different type information corresponding to different encapsulation methods; and
    performing tunnel encapsulation on the first data packet according to the encapsulation method corresponding to the first data packet to obtain the second data packet.

3. The method according to claim 2, wherein performing tunnel encapsulation on the first data packet according to the encapsulation method corresponding to the first data packet to obtain the second data packet includes, in response to the encapsulation method corresponding to the first data packet being a replacement encapsulation method:
    replacing the source IP address of the first data packet;
    generating a packet header of the second data packet according to the encapsulation method corresponding to the first data packet, a source IP address in the packet header of the second data packet being an IP address of the gateway node; and
    encapsulating the first data packet using the packet header of the second data packet to obtain the second data packet.

4. The method according to claim 3, wherein replacing the source IP address of the first data packet includes:
    selecting a conversion IP address corresponding to the first IP address from a conversion network segment having a mapping relationship with the one or more reserved IP addresses in the IP address pool, and replacing the first IP address with the conversion IP address as the source IP address of the first data packet; or
    replacing the first IP address with an IP address of the client as the source IP address of the first data packet.

5. The method according to claim 2, wherein performing tunnel encapsulation on the first data packet according to the encapsulation method corresponding to the first data packet to obtain the second data packet includes, in response to the encapsulation method corresponding to the first data packet not being a replacement encapsulation method:
    generating a packet header of the second data packet according to the encapsulation method corresponding to the first data packet, a source IP address in the packet header of the second data packet being an IP address of the gateway node; and encapsulating the first data packet using the packet header of the second data packet to obtain the second data packet, the source IP address of the first data packet being the first IP address unchanged.

6. The method according to claim 2, further comprising:
determining the type information of the first data packet according to type information of the business server, the type information of the business server being related to a way of establishing the business server.

7. The method according to claim 2, wherein the type information of the first data packet is stored in an option field of the first data packet, the option field carrying self-defining data.

8. The method according to claim 1, wherein determining the first IP address from the IP address pool according to the request data packet transmitted by the client includes:
determining the business server for processing the request data packet from a plurality of candidate business servers using a scheduling algorithm; and
determining the first IP address from the IP address pool according to information about the business server.

9. The method according to claim 8, wherein:
the information about the business server includes an IP address and a port number of the business server; and
determining the first IP address from the IP address pool according to the information about the business server includes:
processing the IP address and the port number of the business server using a hash algorithm to obtain a hash value; and
determining the first IP address from the IP address pool according to the hash value.

10. The method according to claim 1, further comprising:
receiving a reply data packet corresponding to the second data packet and transmitted by the business server;
performing tunnel de-encapsulation on the reply data packet to obtain a response data packet;
determining the first IP address according to a destination IP address of the response data packet;
determining the client according to the first IP address; and
generating a feedback data packet based on content in the response data packet, a destination IP address of the feedback data packet being an IP address of the client.

11. The method according to claim 1, further comprising:
obtaining the IP address pool allocated by a global management and control node, the global management and control node applying for the one or more reserved IP addresses in batches, creating at least one IP address pool, and allocating the at least one IP address pool to at least one gateway node;
writing one reserved IP address of the one or more reserved IP addresses in the IP address pool into an IP address configuration table;
reading the one reserved IP address from the IP address configuration table; and
adding the one reserved IP address to the gateway node.

12. The method according to claim 1, further comprising:
obtaining a connection number within a target period, the connection number being number of communication connections between one or more clients carried by the gateway node and the business server;
transmitting the connection number to a scheduling decision node; and receiving an extended IP address pool transmitted by a global management and control node in response to the connection number being greater than or equal to a threshold, the extended IP address pool including at least one newly added reserved IP address.

13. A non-transitory computer-readable storage medium storing one or more computer programs that, when executed by one or more processors to implement the data packet transmission method according to claim 1.

14. A computer device comprising:
one or more processors; and
one or more memories storing one or more computer programs that, when executed by the one or more processors, cause the one or more processors to:
determine a first Internet protocol (IP) address from an IP address pool according to a request data packet transmitted by a client, the IP address pool including one or more reserved IP addresses not recognizable by a business server;
generate a first data packet according to the request data packet and the first IP address, the first IP address being a source IP address of the first data packet;
perform tunnel encapsulation on the first data packet to obtain a second data packet, the second data packet including content of the first data packet; and
transmit the second data packet to the business server.

15. A data packet transmission method performed by a business server and comprising:
receiving a second data packet transmitted by a gateway node, a source Internet protocol (IP) address of the second data packet being an IP address of the gateway node;
performing tunnel de-encapsulation on the second data packet to obtain a first data packet;
obtaining request information of the request data packet from the first data packet;
generating a response data packet based on the request information, a corresponding relationship existing between five-tuple information of the response data packet and five-tuple information of the first data packet;
obtaining a connection relationship indicating the gateway node transmitting the second data packet;
determining the IP address of the gateway node according to the connection relationship;
performing tunnel encapsulation on the response data packet according to the IP address of the gateway node to obtain a reply data packet, a destination IP address of the reply data packet being the IP address of the gateway node; and
transmitting the reply data packet to the gateway node.

16. The method according to claim 15, wherein determining the IP address of the gateway node according to the connection relationship includes:
obtaining the five-tuple information of the response data packet; and
determining the IP address of the gateway node from the connection relationship according to the five-tuple information of the response data packet.

17. The method according to claim 15, further comprising:
obtaining five-tuple information of the first data packet; and
storing the five-tuple information of the first data packet and the IP address of the gateway node in a connection relationship using a hash algorithm, the five-tuple information of the first data packet serving as a hash key value, and the IP address of the gateway node serving as a hash value.

18. A computer device comprising:
one or more processors; and
one or more memories storing one or more computer programs that, when executed by the one or more processors, cause the one or more processors to implement the data packet transmission method according to claim 15.

19. A non-transitory computer-readable storage medium storing one or more computer programs that, when executed by one or more processors to implement the data packet transmission method according to claim 15.

* * * * *